Oct. 27, 1970          E. H. KUSIAK          3,536,415
                    CYCLIC PITCH ACTUATOR
Filed April 18, 1969                      2 Sheets-Sheet 1

INVENTOR
EDWARD H. KUSIAK
BY Laurence A. Savage
         AGENT

United States Patent Office 3,536,415
Patented Oct. 27, 1970

3,536,415
CYCLIC PITCH ACTUATOR
Edward H. Kusiak, Longmeadow, Mass., assignor to United Aircraft Corporation, East Hartford, Conn., a corporation of Delaware
Filed Apr. 18, 1969, Ser. No. 817,441
Int. Cl. B64c *11/38, 27/72*
U.S. Cl. 416—160                    5 Claims

ABSTRACT OF THE DISCLOSURE

A cyclic pitch system for propeller and rotor blades and fan vanes is provided by the combination of a planetary gear system disposed within each blade shank, and axially moving cyclic input links connected to the sun gear and separate axially moving collective pitch change links connected to the planet cage.

BACKGROUND OF THE INVENTION

Field of the invention

This invention relates to propeller and rotor blade and fan vane pitch change systems and particularly to cyclic pitch systems.

Description of the prior art

The well-known type of cyclic pitch system is that used for helicopter rotors wherein collective pitch blade load is taken through a swash plate-thrust bearing and a hub-thrust bearing, both of which bearings rotate at rotor r.p.m. The hub-thrust bearing must also carry the total thrust (lift) load of the rotor; and since the size of a bearing is determined by speed and load, the aforementioned bearings must necessarily be large and heavy because both bearings must support the full collective pitch blade load at full rotor r.p.m. Furthermore, the cyclic pitch actuator in such a system supports the full collective pitch blade load, as well as the cyclic load, thereby requiring a size much greater than is required to actuate cyclic pitch. My invention obviates these undesirable features.

SUMMARY OF THE INVENTION

One object of the present invention is to provide a pitch change system in which the cyclic pitch and collective pitch systems are physically separate so that none of the collective pitch blade load is taken by the cyclic pitch bearings.

Another object of the present invention is to provide a collective and cyclic pitch change system such that a propeller may be made with a small diameter tail shaft of any desired length.

In accordance with the present invention a cyclic pitch system which attains the above-mentioned objects is provided by the combination of a planetary gear arrangement at each blade or vane, axially movable means within the propeller hub operatively connected to the planet cage for collective pitch change, separate axially movable means within the hub operatively connected to the sun gear for cyclic pitch, and means for actuating the collective and cyclic pitch mechanisms.

The foregoing and other objects, features and advantages of the present invention will become more apparent in light of the following detailed description of a preferred embodiment thereof, as illustrated in the accompanying drawings.

DESCRIPTION OF THE PREFERRED EMBODIMENT

Figures 1, 4:
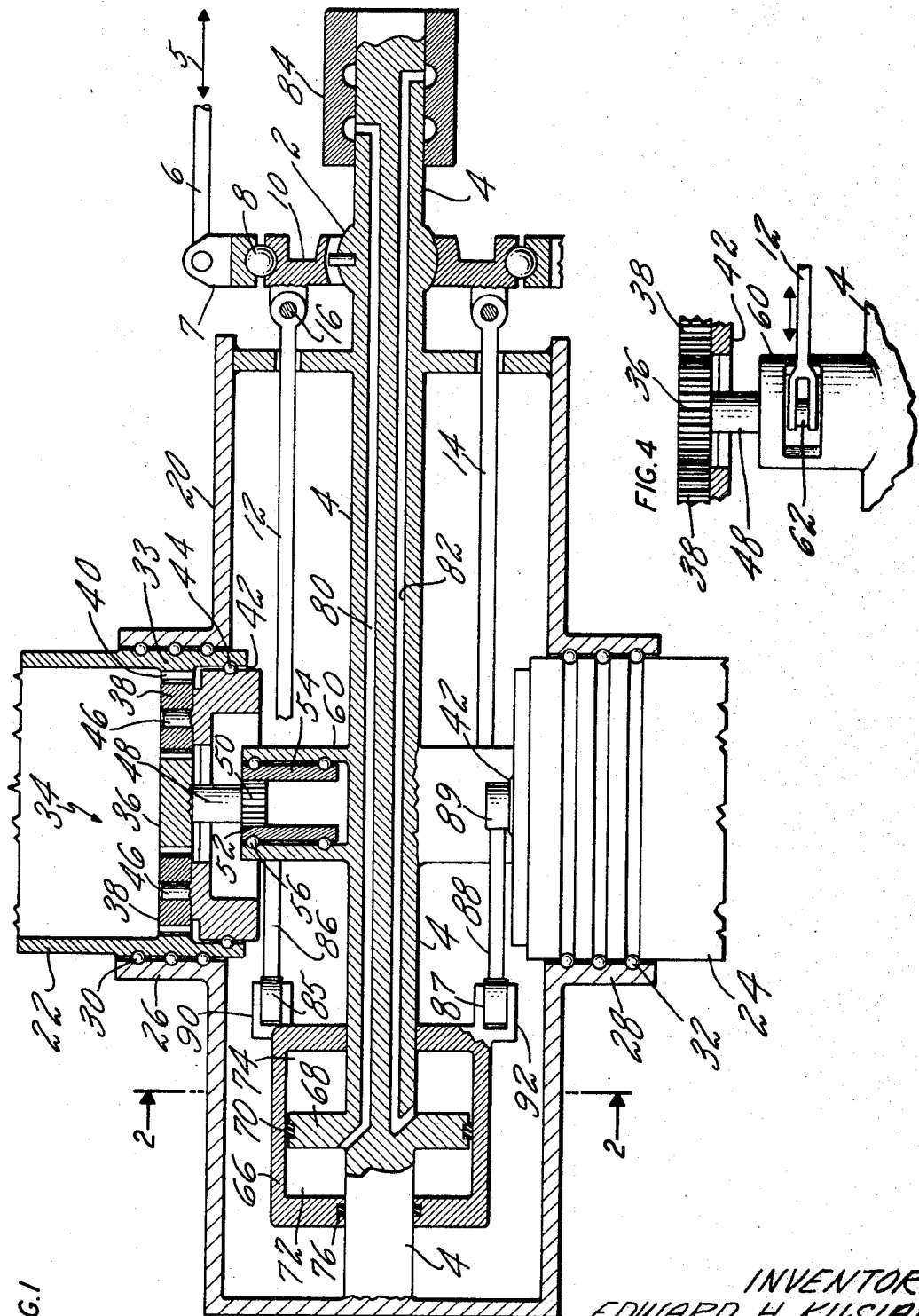
FIG. 1 is a sectioned elevation view of a propeller having a combined collective and cyclic pitch system in accordance with the present invention.
FIG. 4 is a side elevation view of the sun gear of one blade showing the linkage for controlling cyclic pitch.
Figure 2:
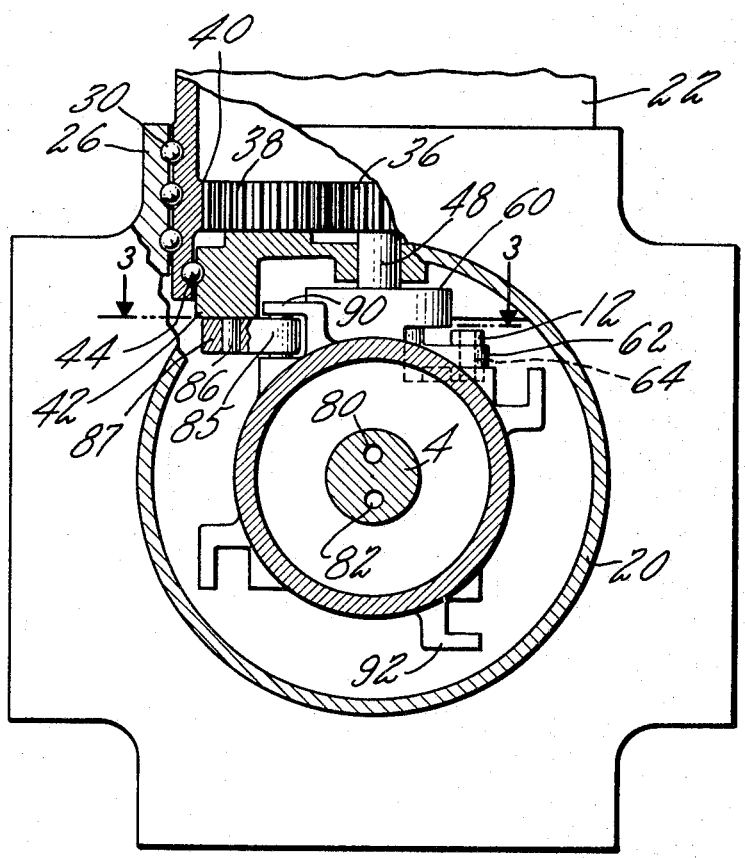
FIG. 2 is a partial section view taken along line 2—2 of FIG. 1.

Referring to FIG. 1 and FIG. 2 (wherein like numerals refer to like components), there is shown a combined collective pitch and cyclic pitch system. A support bearing 2 for cyclic input is provided on a main shaft 4. Cyclic input signal means 6 conduct the cyclic signal through bearings 8 to inner race 10 which rotates with the main shaft 4. As will be obvious, as the signal means 6 translated, the inner race 10 will rotate about the center of the support bearing 2, moving therewith, linearly cyclic pitch links 12 and 14 which are pivotally mounted to the inner race 10 by pins 16 and 18.

Disposed within the propeller housing 20 are propeller blades 22 and 24 rotatably supported for pitch change in barrels 26 and 28 by bearings 30 and 32. Of course, any number of blades may be used in this configuration. Mounted within each blade shank 33 is a small planetary gear system shown generally by the numeral 34. The gear system is comprised of a sun gear 36, planet gears 38, a ring gear 40 on the inside of the blade shank 33, and a planet cage 42. The planet cage is supported by bearings 44 for rotation within the blade shank 33. The planet gears 38 are operatively connected to the planet cage 42 for rotation therewith by means of pins 46. The sun gear 36 is supported by a shaft 48 which terminates in a splined portion 50. The splined portion meshes with a spline 52 on the inner diameter of the inner race 54 of bearings 56. The outer race 58 of the bearings 56 is a support shaft 60 which may be integrally connected to the main shaft 4. As will be obvious to one skilled in the art, instead of the ring gear being integral with the blade shank and the planet cage being connected to the collective pitch link, the ring gear could be connected to the collective pitch link and the planet cage rigidly affixed to the blade shank, which would result in the equivalent operation.

Figure 3:
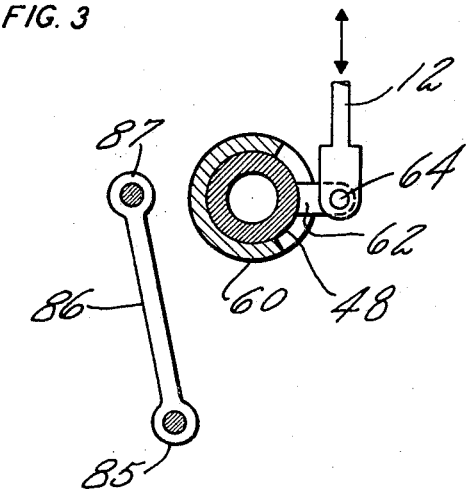
FIG. 3 is a section view taken along line 3—3 of FIG. 2.

As shown best in FIG. 3 and FIG. 4 (where like numerals refer to like components), the cyclic link 12 is pinned to an ear 62 of the shaft 48 by pin 64 so as to allow rotation of the sun gear 36 when the cyclic link 12 moves axially (or linearly).

Referring again to FIG. 1 and FIG. 2, and to FIG. 3 (wherein like numerals refer to like components), an axially movable collective pitch cylinder 66 is provided within the housing 20 for cooperating with a piston 68 operatively connected to the main shaft 4. An O-seal 70 may be provided to prevent leakage of hydraulic fluid between the two chambers 72 and 74 formed by the cylinder 66 and the piston 68. O-seal 76 may be provided in the end 78 of the cylinder 66 to prevent leakage therefrom. Hydraulic fluid is directed to the chambers 72 and 74 by lines 80 and 82, respectively, which terminate in a transfer bearing 84, which may be of any of the types well known in the art to be suitable for getting oil from a stationary point to a rotating shaft or chamber. Other methods of pressuring chambers could also be used, such as a pump disposed inside the propeller and rotating therewith and providing oil to a closed system within the propeller housing 20. The ends 85 and 87 of collective pitch links 86 and 88 are pinned to the cylinder 66 at bosses 90 and 92, respectively. The other ends 87 and 89 of the collective links 86 and 88 are pinned to the planet cage 42 (as shown best in FIG. 2). It will be understood that for clarity of the drawings, FIG. 2 shows only one cyclic link 12 and one collective link 86 connected to the planetary gear system.

Figure 5:
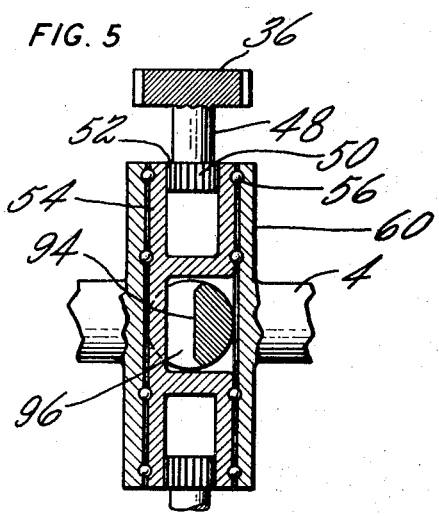
FIG. 5 is a partial schematic view showing another embodiment of my invention as applied particularly to a four-bladed propeller.

FIG. 5 shows another embodiment of my invention which is applicable to an even number bladed propeller only (whereas the embodiment shown in FIGS. 1–4 could be utilized with any number of blades). In this embodiment (where like numerals refer to like components), the inner race 54 of the bearing 56 is carried across to the opposite blade so that torque of the sun gear is reacted against the opposite sun gear. For a four-bladed propeller, the shaft 94 connecting the two sun gears of the blades which are perpendicular to the plane shown is necked down and passes through an opening 96 therefor in the inner race 54. This embodiment has the following advantages: (1) it eliminates two cyclic links (for a four-bladed propeller); (2) it reduces the heat loss due to friction in the rotating support bearing 2 during cyclic pitch; (3) it reduces the weight of the system; (4) it reduces the load on the cyclic links because they see only cyclic load; and (5) the cyclic mechanism at the planet gears is of a higher efficiency than a conventional linkage system, thereby reducing heat generation.

In operation, during collective pitch the sun gear 36 acts as a ground. That is, as oil is fed to the chamber 72, for example, via line 80 and oil is withdrawn from the chamber 74 via line 82, the cylinder 66 moves to the left in FIG. 1. Since the sun gear 36 is connected to cyclic link 12 which does not move during collective pitch change, it remains stationary. The cylinder, in moving to the left, pulls the collective links 86 and 88 to the left, thereby rotating the planet cage 42 to which they are pinned. The rotation of the planet cage 42 causes the planet gears 38 to rotate about the fixed sun gear 36, thereby causing the blades to rotate because the planet gears mesh with the ring gear 40 in the blade shank 33. During collective pitch change, as will be obvious, all blades move together.

During cyclic pitch, the cylinder 66 is stationary and, therefore, collective links 86 and 88 and the planet cage 42 are fixed. As the cyclic input signal means 6 is moved linearly fore and aft as shown by the arrow 5, the outer race 7 of the bearing 8 rotates, rotating the inner race 10 so that it no longer lies in the plane of rotation of the propeller, but in a plane which is inclined with respect to the axis of rotation of the propeller. This causes the cyclic link of each blade to move axially fore and aft (simple harmonic motion) as the propeller rotates through its 360° path about the axis of rotation, thus causing the pitch of the blades to cycle.

There has thus been described a preferred embodiment of a combined collective and cyclic pitch system. It should be understood by those skilled in the art that while a particular cyclic pitch input means has been shown mounted on a rotating ball joint-type support bearing, other arrangements such as a universal joint or a gimbal could be substituted therefor with equivalent result; it should also be understood that while a propeller blade pitch change mechanism has been shown to describe a preferred embodiment of my invention, my invention also has utility with regard to helicopter rotors and for vane pitch change mechanisms; and it should be understood further that various types of collective pitch actuators may be substituted for the one shown in the preferred embodiment without departing from the spirit and scope of the invention, which is to be limited only as set forth in the following claims.

What I claim as new and desire to secure by Letters Patent of the United States of America is:

1. Pitch changing means for blades rotatably mounted in a hub for pitch change movement, comprising:
a planetary gear system disposed within each blade shank having a sun gear, a plurality of planet gears fixed to a planet cage for rotation therewith, said planet gears meshing with a ring gear integral with said blade shank;
collective pitch actuator means disposed within said propeller hub on an axial main shaft;
collective pitch links operatively connected to said planet cage and to said collective pitch actuator means whereby said collective pitch links move axially in response to movement of the collective pitch actuator means, thereby rotating said planet cage and changing the pitch of all blades simultaneously;
cyclic pitch actuating means;
rotating support bearing means disposed on said axial main shaft including receiving means for receiving a cyclic input from said cyclic pitch actuating means; and
cyclic links operatively connected to said sun gears and to said receiving means whereby said cyclic pitch links move axially in response to movement of said cyclic pitch actuator means with simple harmonic motion thereby cycling the pitch of the blades as the propeller rotates through 360°.

2. Pitch changing means for blades rotatably mounted in a hub for pitch change movement, comprising:
a planetary gear system disposed within each blade shank having a sun gear, a plurality of planet gears fixed to a planet cage for rotation therewith, said planet gears meshing with a ring gear integral with said blade shank;
collective pitch actuator means disposed within said propeller hub on an axial main shaft;
collective pitch links operatively connected to said planet cage and to said collective pitch actuator means whereby said collective pitch links move axially in response to movement of the collective pitch actuator means, thereby rotating said planet cage and changing the pitch of all blades simultaneously;
cyclic pitch actuator means; and
rotating support means disposed on said axial main shaft including means for causing an axial cyclic pitch input signal motion to establish a plane inclined to the axis of rotation of the propeller and means by which the ends of cyclic pitch links are operatively held in that plane, the other ends of said cyclic pitch links operatively connected to said sun gears whereby said cyclic pitch links move axially in response to movement of said cyclic pitch actuator means with simple harmonic motion thereby cycling the pitch of the blades as the propeller rotates through 360°.

3. Pitch changing means for blades rotatably mounted in a hub for pitch change movement, comprising:
a planetary gear system disposed within each blade shank having a sun gear, a plurality of planet gears fixed to a planet cage for rotation therewith, said planet gears meshing with a ring gear integral with said blade shank;
an axial main shaft disposed substantially along the axis of the propeller hub for rotation therewith;
collective pitch actuator means disposed within said propeller hub on said axial main shaft;
collective pitch links operatively connected to said planet cage and to said collective pitch actuator means whereby said collective pitch links move axially in response to movement of the collective pitch actuator means, thereby rotating said planet cage and changing the pitch of all blades simultaneously;
cyclic pitch actuator means; and
cycling means disposed on said axial main shaft operatively connected to said cyclic pitch actuator means for converting the motion of said cyclic pitch actuator means into cyclic axial movement of cyclic links, each of said cyclic links being operatively connected to said sun gear at its first end and operatively connected to said cycling means at its second end whereby said cyclic links move axially fore and aft in response to movement of said cyclic pitch actuator means with simple harmonic motion thereby cycling the pitch of the propeller blades as the propeller rotates through 360°.

4. Pitch changing means for an even-number bladed propeller having blades rotatably mounted in a hub for pitch change movement, comprising:

an axial main shaft rotating with the propeller;

a planetary gear system disposed within a first blade shank having a plurality of planet gears fixed to a planet cage for rotation therewith, said planet gears meshing with a ring gear integral with said blade shank, and a sun gear meshing with said planet gears, said sun gear being rotatably mounted in bearing means having an outer race disposed on said axial main shaft, and an inner race continuing past said axial main shaft and also forming the inner race for the bearing means of the sun gear of the blade shank located 180° from said first blade shank so that the torque of the sun gear of the first blade shank is reacted by the torque of the sun gear of the second blade shank;

cyclic pitch actuator means;

cycling means disposed on said axial main shaft operatively connected to said cyclic pitch actuator means for converting the motion of said cyclic pitch actuator means into cyclic axial movement of a cyclic link;

a cyclic link for each 180° opposed pair of blade shanks, said cyclic link being operatively connected to one of the sun gears of the opposed blade shanks at its first end and operatively connected to said cycling means at its second end, whereby each said cyclic link moves axially fore and aft in response to movement of said cyclic pitch actuator means thereby cycling the pitch of the opposed pair of blades as the propeller rotates;

collective pitch actuator means disposed within said propeller hub on said axial main shaft; and a collective pitch link for each blade operatively connected to said planet cage and to said collective pitch actuator means whereby said collective pitch links move axially in response to movement of the collective pitch actuator means, thereby rotating said planet cage and changing the pitch of all blades simultaneously.

5. Pitch changing means for blades rotatably mounted in a hub for pitch change movement, comprising:

a planetary gear system disposed within each blade shank having a sun gear, a plurality of planet gears for meshing with said sun gear and fixed to a planet cage for rotation therewith, said planet cage rigidly connected to the blade shank, said planet gears meshing with a ring gear operatively connected to a collective pitch link;

collective pitch actuator means disposed within said propeller hub on an axial main shaft;

collective pitch links operatively connected to said ring gear and to said collective pitch actuator means whereby said collective pitch links move axially in response to movement of the collective pitch actuator means, thereby rotating said ring gear and changing the pitch of all blades simultaneously;

cyclic pitch actuating means;

rotating support bearing means disposed on said axial main shaft including receiving means for receiving a cyclic input from said cyclic pitch actuating means;

cyclic links operatively connected to said sun gears and to said receiving means whereby said cyclic pitch links move axially in response to movement of said cyclic pitch actuator means with simple harmonic motion thereby cycling the pitch of the blades as the propeller rotates through 360°.

References Cited

UNITED STATES PATENTS

| 2,127,687 | 8/1938 | Heath | 416—160 X |
| 2,600,097 | 6/1952 | Cornillon | 416—114 |
| 2,648,387 | 8/1953 | Doman | 416—160 X |

FOREIGN PATENTS

| 201,106 | 1/1966 | Sweden. |

EVERETTE A. POWELL, Jr., Primary Examiner

U.S. Cl. X.R.

416—114, 157